United States Patent [19]

Hulscher

[11] 4,246,730
[45] Jan. 27, 1981

[54] SUPPORT STRUCTURE FOR A ROOF OF AN ACCOMODATION FOR CULTIVATION

[75] Inventor: Alphonsus J. Hulscher, Leiden, Netherlands

[73] Assignee: Handelsonderneming Priva B.V., Delier, Netherlands

[21] Appl. No.: 74,303

[22] Filed: Sep. 11, 1979

[30] Foreign Application Priority Data

Sep. 15, 1978 [NL] Netherlands .......................... 7809424

[51] Int. Cl.³ .............................................. E04B 7/02
[52] U.S. Cl. ......................................... 52/90; 52/263
[58] Field of Search ................... 52/90, 648, 645, 721, 52/693, 93, 649, 65 D, 263, 86

[56] References Cited

U.S. PATENT DOCUMENTS

| | | | |
|---|---|---|---|
| 2,263,214 | 11/1941 | Larkin et al. | 52/90 |
| 3,058,549 | 10/1962 | Anderson | 52/90 |
| 3,430,582 | 3/1969 | Appelt et al. | 52/90 |
| 3,708,928 | 1/1973 | Gaspers | 52/90 |
| 3,762,111 | 10/1973 | Harada | 52/90 |
| 3,925,942 | 12/1975 | Hemmelsbach | 52/648 |
| 3,948,012 | 4/1976 | Papayoti | 52/648 X |
| 3,999,351 | 12/1976 | Rensch | 52/721 X |
| 4,121,398 | 10/1978 | Hahn et al. | 52/648 X |

FOREIGN PATENT DOCUMENTS

2031168 1/1972 Fed. Rep. of Germany .............. 52/90

*Primary Examiner*—J. Karl Bell
*Attorney, Agent, or Firm*—Haseltine and Lake

[57] ABSTRACT

A support structure for a roof of an accomodation for cultivation, in particular a green house, comprises posts lined up in rows for supporting a roof structure, said posts being provided with cross beams, which are rigidly connected with said posts and which run toward a direction, deviating from the direction in which the posts are located, and which also deviate from a direction perpendicular to said row, said cross beams being connected with cross beams of a neighboring post.

12 Claims, 8 Drawing Figures

SUPPORT STRUCTURE FOR A ROOF OF AN ACCOMODATION FOR CULTIVATION

BACKGROUND OF THE INVENTION

The present invention relates to a support structure for a roof of an accomodation for cultivation, in particular a green house, comprising posts lined up in rows for supporting a roof structure, the posts being provided with cross beams for bracing said support structure.

These types of support structures are known per se and between the individual roof sections, a gutter is provided in the roof structure, said gutter being supported by posts lined up in rows. In each row the posts are disposed at a distance of 3-3.20 meters from each other, whereas the distance between two rows of posts, i.e. the posts for a neighboring gutter, amounts to approximately 6-6.40 meters. The posts are then lined up in a quadrangle, that is, all first posts of each row underneath a gutter, are also part of a row running in a direction transverse to the original row. This likewise applies to the second and subsequent posts of each row. Each cultivating section in the accomodation for cultivation is so formed between two rows of posts under a roof section. A large number of rows of posts can thus be juxtaposed. So as to obtain a bracing in the roof structure, the gutter on the posts has a certain strength, possibly improved by auxiliary struts. In order to bridge the great width of the cultivating area, purlins are provided which are called lattice girders and which are located between all first posts of each row as well as between the subsequent posts of the rows. Each lattice girder consists of an upper and a lower purlin joined to one another by a diagonal joint. The end of each lattice girder is mounted to the side of a post. On the top of the lattice girder there are provided supporting poles or tie rods adapted to support and/or wind-brace the roof. The underside of the lattice girder serves the suspend the cultivating lines, spraying ducts, etc.

Since nowadays sun blinds are being used in the cultivating area which are in the form of horizontally running curtains, it is not possible to properly support these blinds, as the top side of each lattice girder is connected to the roof structure and the underside is provided with cultivating lines or spraying ducts.

In order, none the less, to be able to use sun blinds, there is provided underneath the lattice girder a second purlin which is called energy girder. The underside of said energy girder is provided with the usual cultivating wires, spraying ducts, etc., whereas the top side of the energy girder serves to support the sun blinds. Usually, enough space is available underneath the gutters of the roof structure to enable the use of a good, strong support structure in relation to the dimensions of the posts; also, the gutters may be of such a rigid form that a relatively great length can be bridged. Thus, the distance between two neighboring posts in a row can be easily doubled, for example up to a distance of 6-6.40 meters, with less cast shadow occurring.

Thus far, enlarging the distance between the posts in a row has been hardly feasible, because there would arise too great a distance between the lattice girders.

SUMMARY OF THE INVENTION

It is an object of the present invention to provide a novel accomodation for cultivation, wherein, although the distance between the posts is large, a sufficient sturdiness or bracing in the roof structure still being afforded.

This object is attained according to the invention by means of an accomodation for cultivation of the type described hereinbefore wherein the cross beams being rigidly connected with the posts, run in a direction both deviating from the direction in which each row of posts is placed and from a direction perpendicular to said row, said cross beams being connected to cross beams of a neighboring post. This embodiment eliminates the necessity of providing lattice girders between the corresponding posts in each row. It is even possible to considerably enlarge the distance between two posts in each row, since, according to the invention, the cross beams between two neighboring posts are interconnected by means of an intermediate part.

Between two neighboring posts the cross beams are interconnected through a multiple junction of a part that is coupled to another multiple junction between two cross beams.

A practical embodiment of the accomodation for cultivation according to the present invention consists in that each cross beam has an upper and a lower bar, one end of the bars being mounted to a post spaced from each other, the other end converging in to a multiple junction, this arrangement causing 30% less loss of light.

SURVEY OF THE DRAWINGS

DESCRIPTION OF A PREFERRED EMBODIMENT

Figure 1:
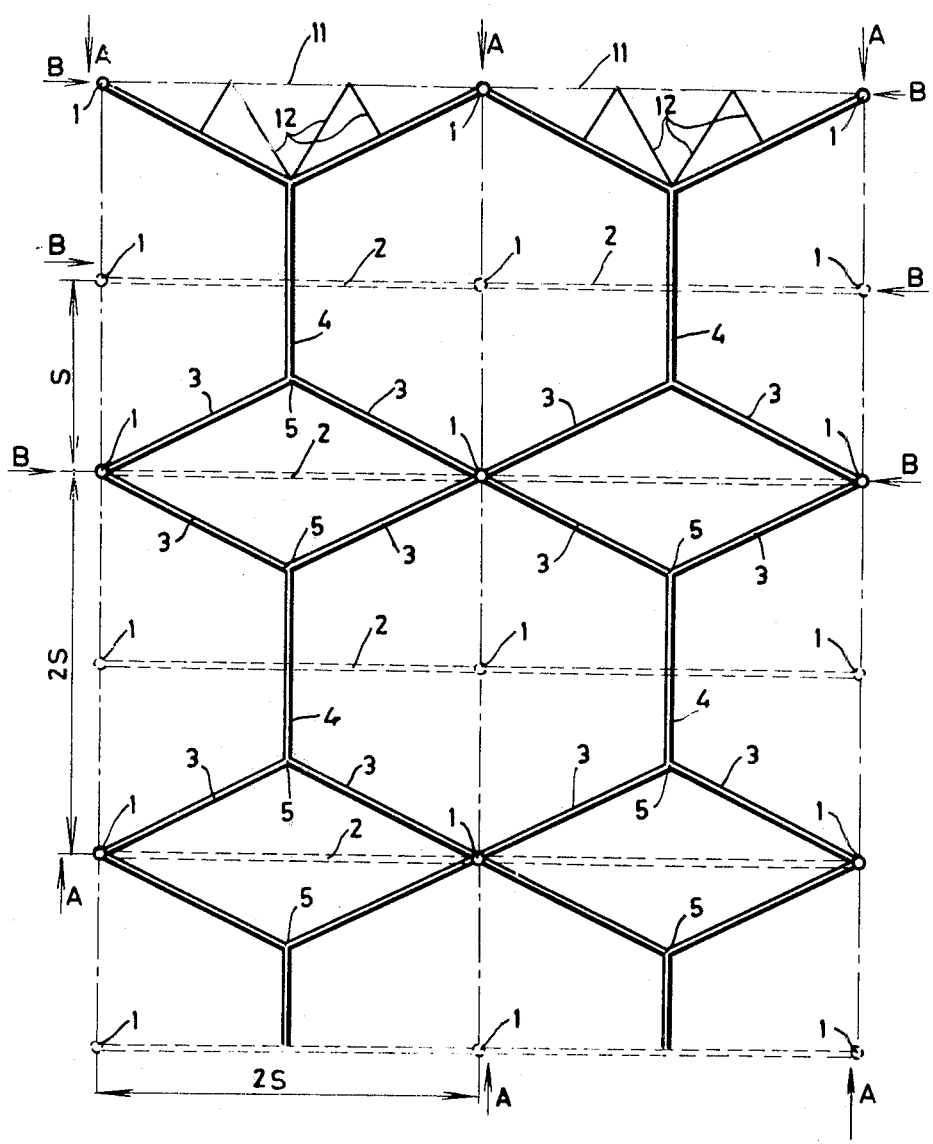
FIG. 1 is a diagrammatic plan view of an accomodation for cultivation according to the present invention, the roof having been removed, two roof sections being used in the present case.

In the diagrammatical plan view of FIG. 1, the rows of posts are in the longitudinal direction of the accomodation for cultivation, referenced A—A. The gutters are located over these rows between the individual roof sections. In the transverse direction, so parallel with the front faces of the accomodation for cultivation, the rows of posts are referenced B—B. In an accomodation for cultivation know per se the distance between the posts 1 and each row A—A is limited; this distance is indicated by S. In an accomodation for cultivation according to the present invention, said distance is 2S.

The latter distance is equal to the distance between two posts 1 in row B—B, said row running parallel with the front faces of accomodations for cultivation. Both in known accomodations for cultivation and in case of the present accomodation for cultivation according to the invention, said distance is 2S toward the direction of the rows B—B. Since the distance 2S corresponds to the width of the cultivating section, the accomodation for cultivation known per se required the use of lattice girders 2 between the posts 1 in the rows B—B, which lattice girders are shown in FIG. 1 by a dotted line. Said lattice girders 2 were used so as to obtain a bracing effect in the roof structure of the known accomodations for cultivations.

The novel accomodation for cultivation in accordance with the present invention now allows an elimination of said lattice girders 2, while the distance between the posts in the rows A—A has additionally been considerably enlarged in a manner such, that the posts 1 drawn with a dotted line in FIG. 1 can be eliminated. This is enabled because of each post having a number of cross beams 3. Said cross beams 3 form a triangular junction due to the presence of upper bars 3a and lower bars 3b.

Figure 2:
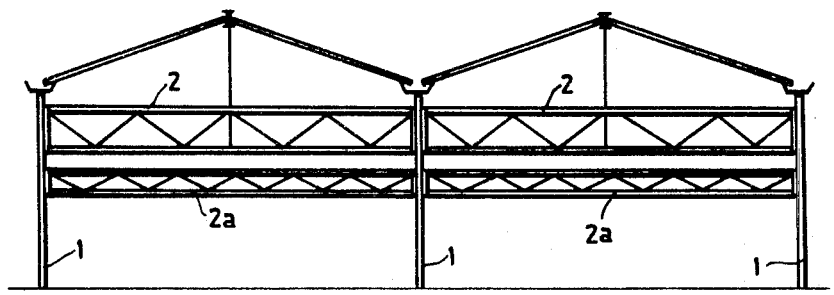
FIG. 2 is a cross-sectional view of two cultivating sections of an accomodation for cultivation known per se.
Figure 3:
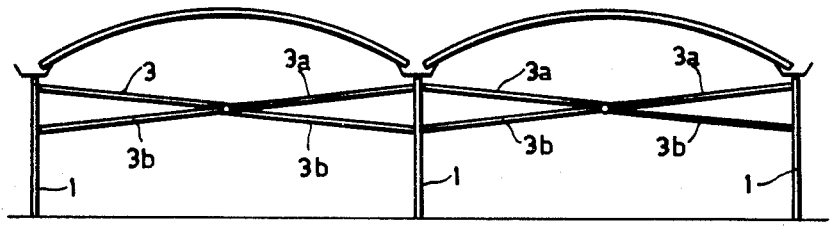
FIG. 3 is a sectional view as shown in FIG. 2, illustrating an accomodation for cultivation according to the present invention.

So as to elucidate the above, FIG. 2 shows an accomodation for cultivation of a type known per se, the bracing between two posts 1 in the row B—B by means of a lattice girder 2 being clearly apparent. As a further elucidation, the figure shows an additional energy girder 2a. In FIGS. 2 and 3, the distance between two neighboring posts corresponds to the distance 2S, which in turn equals the width of the cultivating section between two posts. In the longitudinal direction of the cultivating section, that is, parallel with the direction of the rows A—A, the cross beams 3 of two neighboring posts are interconnected by means of an intermediate coupling bar 4 (see also FIG. 1).

Figure 4:
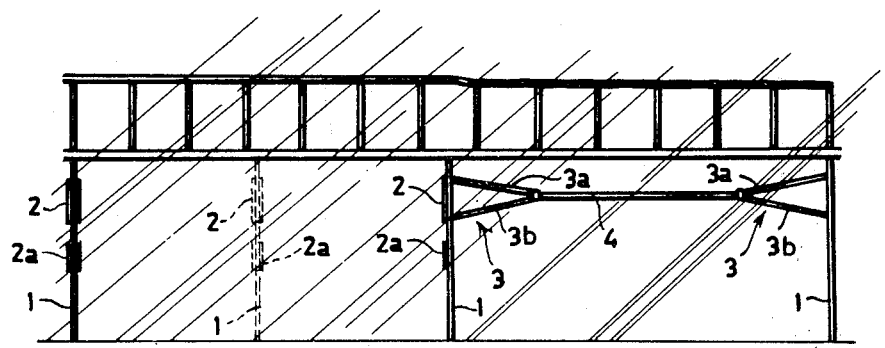
FIG. 4 is a cross-sectional view, in longitudinal direction, of an accomodation for cultivation, the left-hand side of the drawing showing a known accomodation for cultivation, whilst the right-hand side of the drawing shows an accomodation for cultivation according to the present invention.

As is the case in the diagrammatical plan view of FIG. 1, the post 1 and the associated lattice girders 2 and 2a, drawn with dotted lines in FIG. 4, can likewise be eliminated. Thus, between four neighboring posts, there arises a square cultivating section; which offers the advantage that cultivation can proceed both in the longitudinal direction and in the transverse direction of the present accomodation for cultivation.

Moreover, another advantage is attained for accomodations for cultivation having a relatively short length and a relatively large width. Since the front faces of each section are substantially more expensive than the side faces of an accomodation for cultivation, the present invention allows the roof sections to be mounted across the width of the relative accomodation, and a side-face wall containing the usual entrance doors to be erected, on the front side of the accomodation for cultivation. This may result in substantial savings on front faces, since, in the accomodation for cultivation according to the present invention, the direction of cultivation is no longer important.

The cross beams of the posts are always connected to a coupling bar 4 at a multiple junction 5. As a result, cross beams 3 of two neighboring posts 1 in one row, in conjunction with coupling bars 4 located between multiple junctions 5 of the cross beams can possibly form a hexagon (FIG. 1), whilst cross beams 3 of two neighboring posts 1 in a direction perpendicular to the row A—A of the posts enclose a quadrangle in the form of a lozenge. The top angles of the lozenge then are located at a post 1. The length of each coupling bar 4 is then approximately equal to the distance between two multiple junctions 5 of cross beams which enclose a quadrangle and which are located between two posts.

The latter contributes to an effective leveling of forces in the horizontal plane, as a result of which the horizontal wind-bracing, as used so far in known cultivating accomodations, can be eliminated. Due to the strong bracing of the cross beams 3 with the coupling bars 4, arcuate roof structures provided with a supple covering can be used, without any ties for said arcuate roof structures being required. Thus, above the cross beams 3 and the coupling bars 4, there arises a space in which it is easy to accomodate sun blinds, enabling cultivating wires, spraying ducts, etc. to be suspended at the lower part of the cross bars B and the coupling bars 4.

Figure 5:
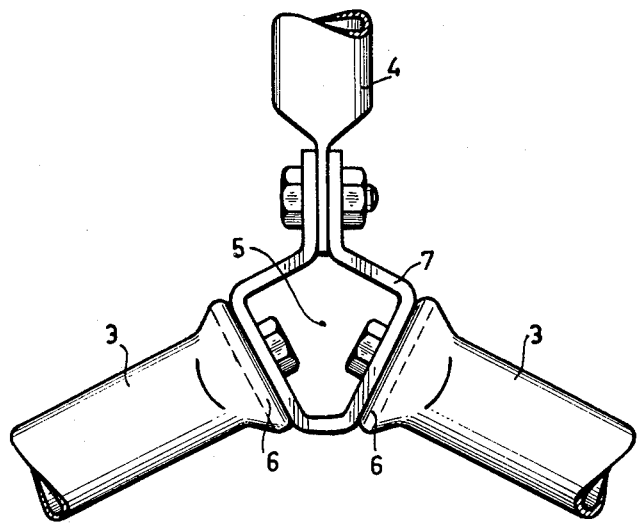
FIG. 5 is a plan view of a multiple junction between two cross beams and a coupling bar.
Figure 6:
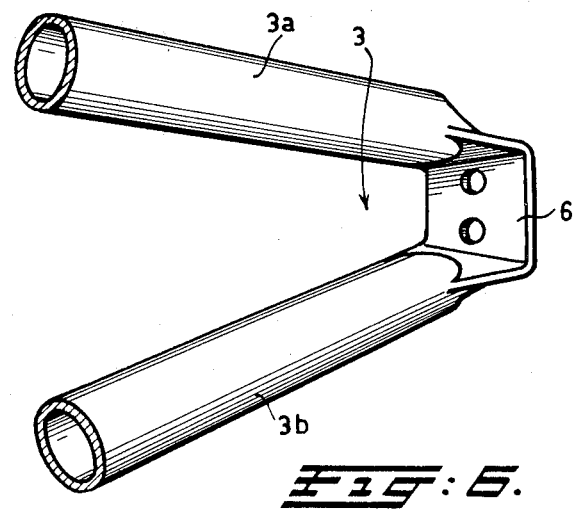
FIG. 6 is a perspective view of the end of a cross beam at the multiple junction of FIG. 5.
Figure 7:
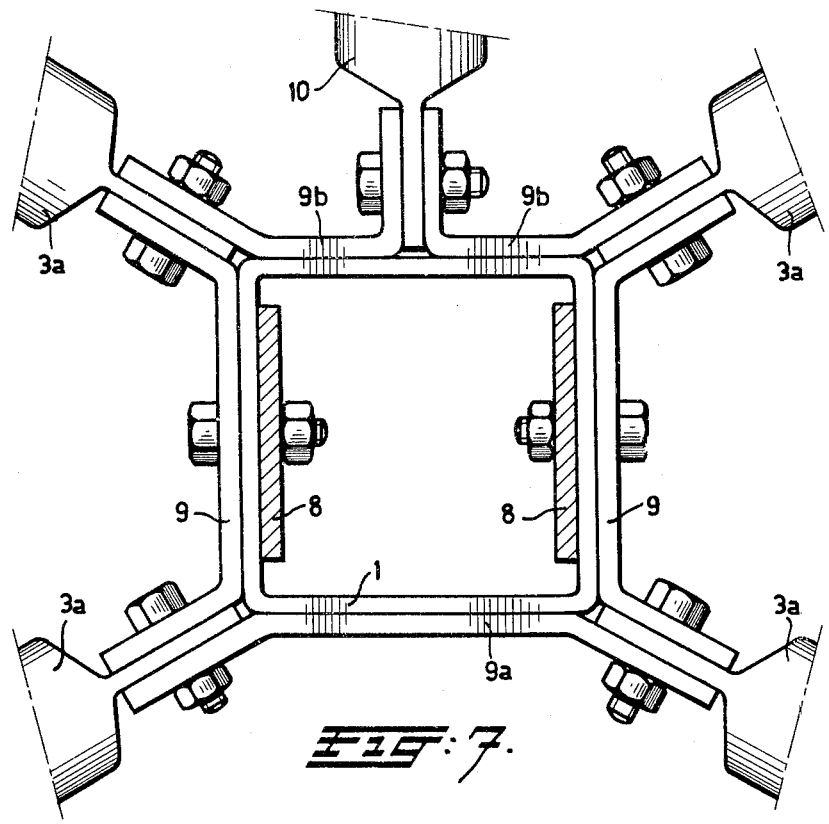
FIG. 7 is a plan view of the means for fastening the cross beams to a post.

FIG. 5 shows, by way of illustration, a multiple junction 5 between two beams 3 and a coupling bar 4. The coupling bars 4, made of a tubular material, are screwed with a flat portion 6 unto a bracket 7. Each cross beam 3 so consists of a tubular upper bar 3a and a tubular lower bar 3b. The upper and lower bars are interconnected by means of the flattened portion 6 and jointly form a multiple junction. The ends of the bracket 7 enclose a flattened portion of a tubular coupling bar 4. The bracket 7 may be fastened to the flattened portion of the coupling bar 4 by means of a bolt. The ends of the tubular bars 3a and 3b, located opposite the flattened portion 6, are flattened as well, and these ends are fixed to a strap mounted around a post 1. A plan view of this fastening means for the bars 3a of the cross beams is shown in FIG. 7. Inside the post 1 there are two fastening strips 8 for supporting the gutter of each roof section. The screw bolt used to fasten this fastening strip 8 may also serve to fasten a bracket 9 on the opposite side of a post 1. With the aid of an auxiliary bracket 9a, a strap is then formed whose ends can enclose a flattened portion of each cross beam. These flattened ends are secured with a fastening bolt. Instead of an auxiliary bracket 9a, two separate auxiliary brackets 9b may be used when an extra strut 10 is desired for a gutter. This strut 10 also has a flattened portion that can be clamped between ends of the auxiliary brackets 9b and fastened by means of a bolt. Downwardly, at some distance from the strap shown in FIG. 7, formed with the brackets 9, 9a and possibly 9b, a second strap may be mounted for fastening the flattened ends of the lower bars 3b of the cross beams.

Figure 8:
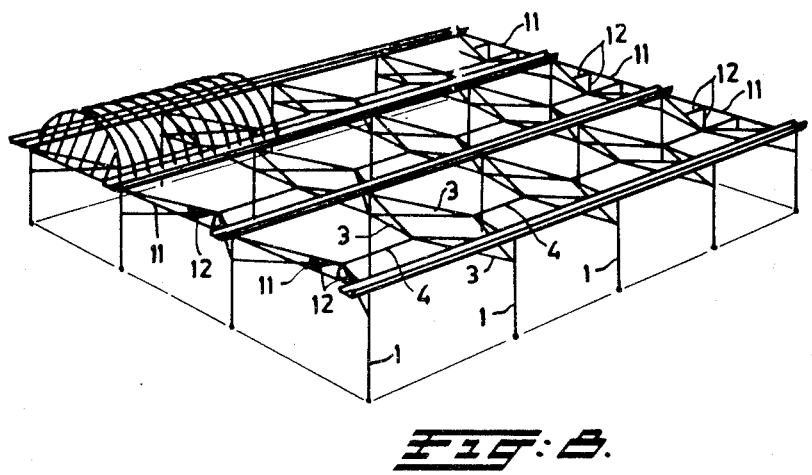
FIG. 8 is a diagrammatical perspective view of an accomodation for cultivation in accordance with the present invention.

FIG. 8 shows a perspective view of an accomodation for cultivation as described hereinbefore, and a portion of the arcuate roof structure.

As illustrated in FIGS. 1 and 8, in the vicinity of opposite faces of the accomodation for cultivation, cross beams 3 have been provided with auxiliary bars mounted to a front girder 11. These auxiliary bars, which are referenced 12, serve to prevent a front girder 11 from bending when for instance strained cultivating wires are fastened to it.

It is in particular apparent from FIG. 4 that the use of cross beams 3 and coupling bars 4 causes considerably less cast shadow to occur in the present accomodation for cultivation in comparison with known structures wherein lattice girders 2 and energy girders 2a have to be used. As a result of the present invention, a reduction of approximately 30% in the loss of light is obtained.

Moreover the present invention allows for a simpler structure, thus causing its erection expenditures to be reduced, whilst a specific direction for cultivation has become superfluous.

What is claimed is:

1. In a support structure for a roof of an accomodation for cultivation, in particular a green house, comprising posts lined up in rows for supporting a roof structure, the posts being provided with cross beams for the bracing in said support structure, said cross beams being rigidly connected with the posts and running in a direction deviating from the direction in which each row of posts is placed and also deviating from a direction perpendicular to said row, said cross beams being connected to cross beams of a neighboring post.

2. In a support structure according to claim 1, wherein cross beams between two neighboring posts are interconnected by means of an intermediate part.

3. In a support structure according to claim 2, wherein cross beams between two neighboring posts are interconnected via a multiple junction of a part that is coupled to another multiple junction between two cross beams.

4. In a support structure according to claim 3, wherein between two multiple junctions of interconnected cross beams a coupling bar is provided.

5. In a support structure according to claim 1, wherein cross beams of two neighboring posts in one row, in conjunction with connecting bars located between multiple junctions of the cross beams, form a hexagon.

6. In a support structure according to claim 1, wherein cross beams of two neighboring posts, in a direction perpendicular toward the row of posts, enclose a quadrangle.

7. In a support structure according to claim 6, wherein the quadrangle has the shape of a lozenge, the inclined top angles of the lozenge being located in the vicinity of the posts.

8. In a support structure according to claim 5, wherein the length of the connecting bar is approximately equal to the distance between two multiple junctions of cross beams beam being formed by a flattened and bent portion of a tube.

9. In a support structure according to claim 1, wherein each cross beam has an upper and a lower bar, the multiple junction between the upper and lower bar of each cross beam being formed by a flattened and bent portion of a tube.

10. In a support structure according to claim 9, wherein the ends of the upper and lower bar mounted to the post are flattened portions of the tube which are fastened to a strap mounted around the post.

11. In a support structure according to claim 4, wherein in the multiple junction between two beams and a connecting bar a separate mounting bracket is provided whose ends enclose a flattened end of the tubular connecting bar.

12. In a support structure according to claim 1, wherein auxiliary bars have been provided between the cross beams in the vicinity of a front face of the accomodation for cultivation and a front girder thereof.

* * * * *